（12）United States Patent
Choi et al.

(10) Patent No.: US 11,034,207 B2
(45) Date of Patent: Jun. 15, 2021

(54) HEAT PUMP SYSTEM FOR VEHICLE

(71) Applicant: HANON SYSTEMS, Daejeon (KR)

(72) Inventors: Young Ho Choi, Daejeon (KR); Sung Ho Kang, Daejeon (KR); Hak Kyu Kim, Daejeon (KR); Seung Ho Lee, Daejeon (KR); Jae Min Lee, Daejeon (KR); Jung Jae Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 200 days.

(21) Appl. No.: 14/907,928

(22) PCT Filed: Mar. 19, 2015

(86) PCT No.: PCT/KR2015/002662
§ 371 (c)(1),
(2) Date: Jan. 27, 2016

(87) PCT Pub. No.: WO2016/114448
PCT Pub. Date: Jul. 21, 2016

(65) Prior Publication Data
US 2016/0339766 A1    Nov. 24, 2016

(30) Foreign Application Priority Data
Jan. 12, 2015  (KR) .................. 10-2015-0003982

(51) Int. Cl.
*B60H 1/00*   (2006.01)
*F25B 5/02*   (2006.01)
(Continued)

(52) U.S. Cl.
CPC ..... *B60H 1/00007* (2013.01); *B60H 1/00921* (2013.01); *F25B 5/02* (2013.01);
(Continued)

(58) Field of Classification Search
CPC ............ B60H 1/00007; B60H 1/00921; B60H 1/3205; B60H 1/3227; B60H 2001/00928;
(Continued)

(56) References Cited

U.S. PATENT DOCUMENTS 6,237,351 B1 * 5/2001 Itoh .................... B60H 1/00921
62/113
6,321,832 B1 * 11/2001 Le ........................ F28D 1/0408
123/41.33
(Continued)

FOREIGN PATENT DOCUMENTS

JP    2003-287294 A    10/2003
JP    2004-142551 A    5/2004
(Continued)

OTHER PUBLICATIONS

English Translation of JP2012017056.*
(Continued)

*Primary Examiner* — Edward F Landrum
*Assistant Examiner* — Melodee Jefferson
(74) *Attorney, Agent, or Firm* — Dickinson Wright PLLC

(57) ABSTRACT

A heat pump system including a compressor mounted on a refrigerant circulation line for compressing and discharging refrigerant. An internal heat exchanger is mounted inside an air-conditioning case. An evaporator is mounted inside the air-conditioning case. An external heat exchanger is mounted outside the air-conditioning case. A first expansion means is mounted on the refrigerant circulation line between the internal heat exchanger and the external heat exchanger to selectively expand refrigerant discharged from the internal heat exchanger. A second expansion means is mounted on the refrigerant circulation line of an inlet side of the evaporator to expand the refrigerant supplied to the evaporator. A coolant circulation line is configured to circulate
(Continued)

coolant toward electronic units of the vehicle. A refrigerant-coolant heat exchanger is configured to exchange heat between the refrigerant flowing the refrigerant circulation line and the coolant circulating through the coolant circulation line.

7 Claims, 4 Drawing Sheets

(51) Int. Cl.
    *F25B 5/04*     (2006.01)
    *F25B 25/00*     (2006.01)
(52) U.S. Cl.
    CPC .............. *F25B 5/04* (2013.01); *F25B 25/005* (2013.01); *B60H 2001/00307* (2013.01); *B60H 2001/00928* (2013.01); *B60H 2001/00949* (2013.01)
(58) Field of Classification Search
    CPC . B60H 2001/00949; F25B 30/02; F25B 41/06
    USPC .............................. 62/238.7, 160, 419, 324.6
    See application file for complete search history.

(56) References Cited

U.S. PATENT DOCUMENTS

| | | | | |
|---|---|---|---|---|
| 6,357,541 | B1* | 3/2002 | Matsuda | B60K 6/22 165/43 |
| 8,744,658 | B1* | 6/2014 | Moretti | B60L 3/0061 180/65.265 |
| 9,250,005 | B2* | 2/2016 | Oomura | B60H 1/00785 |
| 9,523,518 | B2* | 12/2016 | Kitamura | F25B 13/00 |
| 2001/0020529 | A1* | 9/2001 | Karl | B60H 1/00921 165/202 |
| 2003/0041617 | A1* | 3/2003 | Vetter | B60H 1/00335 62/428 |
| 2005/0133215 | A1* | 6/2005 | Ziehr | B60H 1/00392 165/202 |
| 2008/0085672 | A1* | 4/2008 | Creed | B60H 1/00207 454/69 |
| 2008/0314064 | A1* | 12/2008 | Al-Eidan | F25B 13/00 62/324.6 |
| 2010/0326127 | A1* | 12/2010 | Oomura | B60H 1/00785 62/498 |
| 2011/0209491 | A1* | 9/2011 | Maire | F25B 13/00 62/238.7 |
| 2011/0296849 | A1* | 12/2011 | Benson | F01K 25/10 62/6 |
| 2012/0227431 | A1* | 9/2012 | Wang | B60H 1/143 62/238.7 |
| 2012/0266624 | A1* | 10/2012 | Inaba | B60H 1/00899 62/324.6 |
| 2012/0318012 | A1* | 12/2012 | Choi | B60H 1/00921 62/129 |
| 2013/0019615 | A1* | 1/2013 | Choi | B60H 1/00 62/79 |
| 2013/0025311 | A1* | 1/2013 | Graaf | B60H 1/00271 62/238.7 |
| 2013/0081419 | A1* | 4/2013 | Katoh | B60H 1/004 62/278 |
| 2014/0060102 | A1* | 3/2014 | Nemesh | B60H 1/00278 62/238.7 |
| 2014/0069123 | A1* | 3/2014 | Kim | F25B 49/02 62/61 |
| 2014/0352341 | A1* | 12/2014 | Hamamoto | B60H 1/22 62/243 |
| 2014/0360705 | A1* | 12/2014 | Kim | F28F 9/0234 165/140 |
| 2015/0047384 | A1* | 2/2015 | Matter, III | F25B 13/00 62/324.6 |

FOREIGN PATENT DOCUMENTS

| | | |
|---|---|---|
| JP | 2005343221 A | 12/2005 |
| JP | 2011-31704 A | 2/2011 |
| JP | 2012017056 A * | 1/2012 |
| KR | 10-0876063 B1 | 12/2008 |
| KR | 10-1342931 B1 | 12/2013 |
| KR | 20140097688 A | 8/2014 |

OTHER PUBLICATIONS

English Translation of JP2012017056 (Year: 2018).*
International Search Report dated Sep. 30, 2015 from corresponding International Patent Application Serial No. PCT/KR2015/002662.

* cited by examiner

Closing of path (Expansion)    Opening of path (Unexpansion)

HEAT PUMP SYSTEM FOR VEHICLE

CROSS-REFERENCE TO RELATED APPLICATIONS

This application is a National Stage of International Application No. PCT/KR2015/002662, filed Mar. 19, 2015, which claims the benefit and priority of KR 10-2015-0003982 filed Jan. 12, 2015. The entire disclosures of each of the above applications are incorporated herein by reference.

TECHNICAL FIELD

The present invention relates to a heat pump system for a vehicle, and more particularly, to a heat pump system for a vehicle which includes a refrigerant-coolant heat exchanger mounted on a refrigerant circulation circuit of an inlet side of an external heat exchanger to exchange heat between coolant induced into the external heat exchanger and coolant circulating through electronic units of the vehicle.

BACKGROUND ART

In general, an air conditioner for a vehicle includes a cooling system for cooling the interior of the vehicle and a heating system for heating the interior of the vehicle.

At an evaporator side of a refrigerant cycle, the cooling system converts air into cold air by exchanging heat between the air passing outside an evaporator and refrigerant flowing inside the evaporator so as to cool the interior of the vehicle. At a heater core side of a coolant cycle, the heating system converts air into warm air by exchanging heat between the air passing outside the heater core and coolant flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an internal heat exchanger mounted inside an air-conditioning case for exchanging heat with air blown to the interior of the vehicle; and the other one being an external heat exchanger for exchanging heat outside the air-conditioning case, and a direction-adjustable valve for changing a flow direction of refrigerant.

Therefore, according to the flow direction of the refrigerant by the direction-adjustable valve, the internal heat exchanger serves as a heat exchanger for cooling when the cooling mode is operated, and serves as a heat exchanger for heating when the heating mode is operated.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; an internal heat exchanger 32 for radiating heat of the refrigerant discharged from the compressor 30; a first expansion valve 34 and a first bypass valve 36 mounted in parallel for selectively passing the refrigerant passing through the internal heat exchanger 32; an external heat exchanger 48 for exchanging heat with the refrigerant passing through the first expansion valve 34 or the first bypass valve 36 outdoors; an evaporator 60 for evaporating the refrigerant passing through the external heat exchanger 48; an accumulator 62 for dividing the refrigerant passing through the evaporator 60 into a gas-phase refrigerant and a liquid-phase refrigerant; a second expansion valve 56 for selectively expanding the refrigerant supplied to the evaporator 60; and a second bypass valve 58 mounted in parallel with the second expansion valve 56 for selectively connecting an outlet side of the external heat exchanger 48 and an inlet side of the accumulator 62.

In FIG. 1, the reference numeral 10 designates an air-conditioning case in which the internal heat exchanger 32 and the evaporator 60 are embedded, the reference numeral 12 designates a temperature-adjustable door for controlling a mixed amount of cold air and warm air, and the reference numeral 20 designates a blower mounted at an inlet of the air-conditioning case.

According to the heat pump system having the above structure, when a heat pump mode (heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the internal heat exchanger 32, the first expansion valve 34, the external heat exchanger 48, the second bypass valve 58 and the accumulator 62 in order, and then, is returned to the compressor 30. That is, the internal heat exchanger 32 serves as a heater and the external heat exchanger 48 serves as an evaporator.

When an air-conditioning mode (cooling mode) is operated, the first bypass valve 36 and the second expansion valve 56 are opened, and the first expansion valve 34 and the second bypass valve 58 are closed. Furthermore, the temperature-adjustable door 12 closes a passage of the internal heat exchanger 32. Therefore, the refrigerant discharged from the compressor 30 passes through the internal heat exchanger 32, the first bypass valve 36, the external heat exchanger 48, the second expansion valve 56, the evaporator 60 and the accumulator 62 in order, and then, is returned to the compressor 30. That is, the evaporator 60 serves as an evaporator and the internal heat exchanger 32 closed by the temperature-adjustable door 12 serves as a heater in the same with the heat pump mode.

In the meantime, the heat pump system for the vehicle performs condensation just through the external heat exchanger 48 which is an air-cooling type heat exchanger in the air-conditioning mode (cooling mode), and performs evaporation in the external heat exchanger 48 in the heat pump mode (heating mode).

However, in case of the conventional heat pump system for the vehicle, in the air-conditioning mode (cooling mode), the size (thickness or an effective heat-exchanging area) of the internal heat exchanger 48 must be increased in order to enhance cooling performance and reduce power consumption, but the small space of an engine room limits increase of the size and enhancement of performance.

Moreover, in the heat pump mode (heating mode), the conventional heat pump system is limited in an amount of evaporation from the external heat exchanger 48 in order to protect the components and secure durability when outdoor air temperature is low, and cannot absorb heat from the outdoor air and frosting is formed on the external heat exchanger 48 when the outdoor air temperature is lower than temperature of the refrigerant induced into the external heat exchanger 48, thereby deteriorating heating performance of the heat pump system and increasing power consumption due to deterioration in heat exchanging efficiency of the external heat exchanger 48.

DISCLOSURE

Technical Problem

Accordingly, the present invention has been made in an effort to solve the above-mentioned problems occurring in the prior arts, and it is an object of the present invention to provide a heat pump system for a vehicle which includes a refrigerant-coolant heat exchanger mounted on a refrigerant circulation circuit of an inlet side of an external heat exchanger to exchange heat between coolant induced into the external heat exchanger and coolant circulating through electronic units of the vehicle, thereby enhancing cooling performance and reducing power consumption without an increase in size of the external heat exchanger by increasing a condensation amount because refrigerant radiates heat while passing through the refrigerant-coolant heat exchanger and the external heat exchanger in an air-conditioning mode and enhancing heating performance and reducing power consumption by increasing an evaporation amount because refrigerant absorbs heat while passing through the refrigerant-coolant heat exchanger, the external heat exchanger and a chiller in a heat pump mode, and increasing temperature of the refrigerant induced into the external heat exchanger to delay frosting of the external heat exchanger.

Technical Solution

To achieve the above objects, the present invention provides a heat pump system for a vehicle including: a compressor mounted on a refrigerant circulation circuit for compressing and discharging refrigerant; an internal heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an external heat exchanger mounted outside the air-conditioning case for exchanging heat between the refrigerant circulating through the refrigerant circulation circuit and the outdoor air; first expansion valve mounted on the refrigerant circulation circuit located between the internal heat exchanger and the external heat exchanger to selectively expand refrigerant discharged from the internal heat exchanger; second expansion valve mounted on the refrigerant circulation circuit of an inlet side of the evaporator to expand the refrigerant supplied to the evaporator; a coolant circulation circuit configured to circulate coolant toward electronic units of the vehicle to cool the electronic units; and a refrigerant-coolant heat exchanger configured to exchange heat between the refrigerant flowing the refrigerant circulation circuit between the first expansion valve and the external heat exchanger and the coolant circulating through the coolant circulation circuit, wherein the refrigerant circulating through the refrigerant circulation circuit radiates heat to the coolant and the outdoor air while passing through the refrigerant-coolant heat exchanger and the external heat exchanger in an air-conditioning mode, and the refrigerant circulating through the refrigerant circulation circuit absorbs heat from the coolant and the outdoor air while passing through the refrigerant-coolant heat exchanger and the external heat exchanger in a heat pump mode.

In another aspect of the present invention, the present invention provides a heat pump system for a vehicle including: a compressor mounted on a refrigerant circulation circuit for compressing and discharging refrigerant; an internal heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an external heat exchanger mounted outside the air-conditioning case for exchanging heat between the refrigerant circulating through the refrigerant circulation circuit and the outdoor air; first expansion valve mounted on the refrigerant circulation circuit located between the internal heat exchanger and the external heat exchanger to selectively expand refrigerant discharged from the internal heat exchanger; second expansion valve mounted on the refrigerant circulation circuit of an inlet side of the evaporator to expand the refrigerant supplied to the evaporator; a first bypass line which connects the refrigerant circulation circuit of an inlet side of the second expansion valve and the refrigerant circulation circuit of an outlet side of the evaporator with each other to make the refrigerant bypass the second expansion valve and the evaporator in a heat pump mode; a chiller mounted on the first bypass line to exchange heat between the refrigerant flowing along the first bypass line and the coolant circulating through electronic units of the vehicle; a refrigerant-coolant heat exchanger configured to exchange heat between the refrigerant flowing the refrigerant circulation circuit between the first expansion valve and the external heat exchanger and the coolant circulating through the electronic units; and a coolant circulation circuit configured to circulate the coolant of the electronic units of the vehicle toward the refrigerant-coolant heat exchanger in an air-conditioning mode and to circulate the coolant of the electronic units toward the chiller in the heat pump mode.

Advantageous Effects

As described above, because the heat pump system for the vehicle includes the refrigerant-coolant heat exchanger mounted on the refrigerant circulation circuit of the inlet side of the external heat exchanger to exchange heat between coolant induced into the external heat exchanger and coolant circulating through electronic units of the vehicle, the heat pump system can enhance cooling performance and reduce power consumption without an increase in size of the external heat exchanger by increasing a condensation amount because refrigerant radiates heat twice while passing through the refrigerant-coolant heat exchanger and the external heat exchanger in the air-conditioning mode and enhance heating performance and reduce power consumption by increasing an evaporation amount because refrigerant absorbs heat three times while passing through the refrigerant-coolant heat exchanger, the external heat exchanger and the chiller in the heat pump mode.

Moreover, the heat pump system can increase temperature of the refrigerant induced into the external heat exchanger to delay or remove frosting of the external heat exchanger because the refrigerant passing through the refrigerant-coolant heat exchanger is induced into the external heat exchanger after exchanging heat with the coolant.

MODE FOR INVENTION

Figure 1:
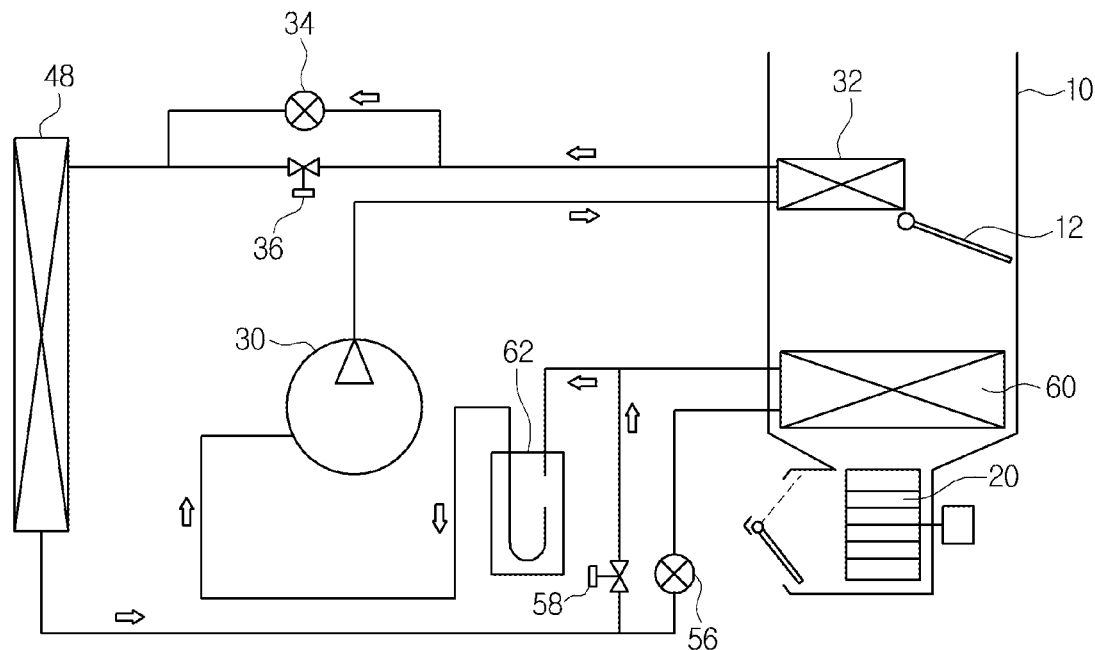
FIG. 1 is a configurative diagram of a conventional heat pump system for a vehicle.

Reference will be now made in detail to the preferred embodiment of the present invention with reference to the attached drawings.

First, a heat pump system for a vehicle according to the present invention includes a compressor 100, an internal heat exchanger 110, first expansion valve 120, a refrigerant-coolant heat exchanger 220, an external heat exchanger 130, second expansion valve 140, and an evaporator 160 which are connected on a refrigerant circulation circuit (R) in order, and is preferably applied to electric vehicles or hybrid vehicles.

The refrigerant circulation circuit (R) is configured in such a way that refrigerant circulates through the compressor 100, the internal heat exchanger 110, the refrigerant-coolant heat exchanger 220, the external heat exchanger 130, the second expansion valve 140, the evaporator 160 and the compressor 100 in an air-conditioning mode, and in such a way that the refrigerant circulates through the compressor 100, the internal heat exchanger 110, the first expansion valve 120, the refrigerant-coolant heat exchanger 220, the external heat exchanger 130 and the compressor 100 in a heat pump mode.

In this instance, on the refrigerant circulation circuit (R), a first bypass line (R1) bypassing the second expansion valve 140 and the evaporator 160 and a second bypass line (R2) bypassing the external heat exchanger 130 are connected in parallel. A first direction changing valve 191 is mounted at a branching point of the first bypass line (R1), and a second direction changing valve 192 is mounted at a branching point of the second bypass line (R2).

Figure 2:
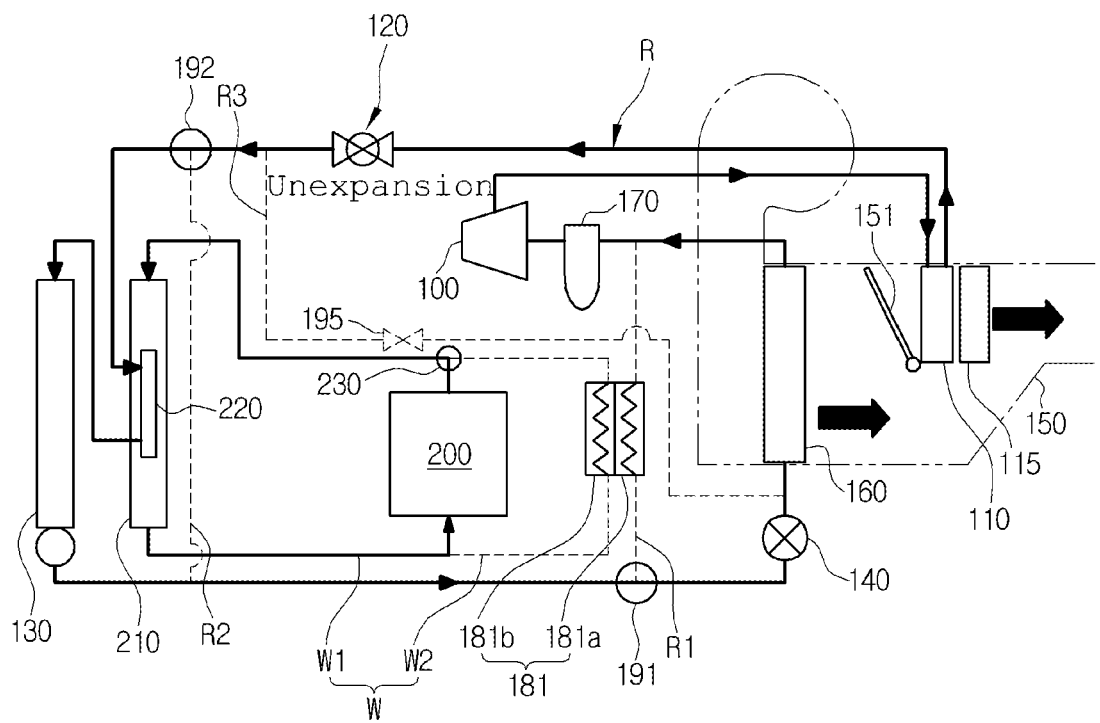
FIG. 2 is a configurative diagram of an air-conditioning mode of a heat pump system for a vehicle according to a preferred embodiment of the present invention.

Therefore, in an air-conditioning mode, as shown in FIG. 2, the refrigerant discharged from the compressor 100 circulates through the internal heat exchanger 110, the refrigerant-coolant heat exchanger 220, the external heat exchanger 130, the second expansion valve 140, the evaporator 160 and the compressor 100 in order. In this instance, the evaporator 160 serves as an evaporator and the refrigerant-coolant heat exchanger 220 and the external heat exchanger 130 serves as a condenser.

As described above, because the refrigerant circulating through the refrigerant circulation circuit (R) radiates heat to coolant and outdoor air while passing through the refrigerant-coolant heat exchanger 220 and the external heat exchanger 130 to increase a condensation amount of the refrigerant in the air-conditioning mode, the heat pump system according to the preferred embodiment of the present invention can enhance cooling performance and reduce power consumption of the system without any increase in size of the external heat exchanger 130.

Figure 3:
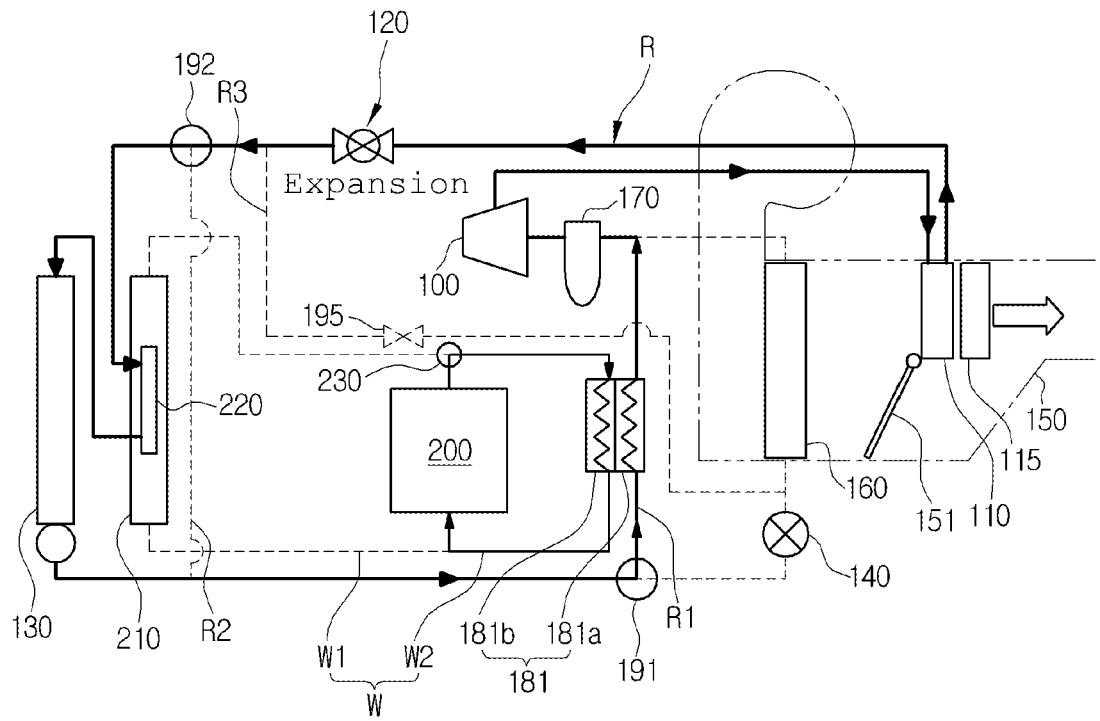
FIG. 3 is a configurative diagram of a heat pump mode of the heat pump system for the vehicle according to the preferred embodiment of the present invention.

In the heat pump mode, as shown in FIG. 3, the refrigerant discharged from the compressor 100 circulates through the internal heat exchanger 110, an orifice 128 of the first expansion valve 120, the refrigerant-coolant heat exchanger 220, the external heat exchanger 130, the bypass line (R1) and the compressor 100 in order. In this instance, the internal heat exchanger 110 serves as a condenser and the refrigerant-coolant heat exchanger 220 and the external heat exchanger 130 serve as an evaporator. The refrigerant is not supplied to the second expansion valve 140 and the evaporator 160.

As described above, in the heat pump mode, because the refrigerant circulating through the refrigerant circulation circuit (R) absorbs heat from the coolant and the outdoor air while passing through the refrigerant-coolant heat exchanger 220 and the external heat exchanger 130, the heat pump system according to the preferred embodiment of the present invention increases the evaporation amount of the refrigerant so as to enhance heating performance and reduce power consumption of the system.

In the meantime, in the heat pump mode, because the refrigerant absorbs heat while passing not only through the refrigerant-coolant heat exchanger 220 and the external heat exchanger 130 but also through a chiller 181, it increases the evaporation amount of the refrigerant more, and hence, the heat pump system can enhance heating performance more and reduce power consumption of the system more.

In the heat pump mode, coolant of electronic units of the vehicle does not circulate toward the refrigerant-coolant heat exchanger 220 but absorbs heat from the coolant congested inside the electric radiator 210.

Meanwhile, during dehumidification of the inside of the vehicle in the heat pump mode, because some of the refrigerant circulating through the refrigerant circulation circuit (R) is supplied to the evaporator 160 through a dehumidification line (R3) which will be described later, the heat pump system can perform dehumidification inside the vehicle.

Hereinafter, components of the heat pump system for the vehicle according to the present invention will be described in detail.

First, the compressor 100 mounted on the refrigerant circulation circuit (R) inhales and compresses refrigerant while operating by receiving a driving force from an engine (an internal combustion engine) or an electric motor, and then, discharges the refrigerant in a gas phase of high-temperature and high-pressure.

The compressor 100 inhales and compresses the refrigerant discharged from the evaporator 160 and supplies to the internal heat exchanger 110 in the air-conditioning mode, and inhales and compresses the refrigerant discharged from the external heat exchanger 130 and passing through the first bypass line (R1) and supplies to the internal heat exchanger 110 in the heat pump mode.

Moreover, in the dehumidification mode of the heat pump mode, because refrigerants are simultaneously supplied to the evaporator 160 through the first bypass line (R1) and the dehumidification line (R3), the compressor 100 inhales and compresses the refrigerants meeting after passing through the first bypass line (R1) and the evaporator 160 and supplies the inhaled refrigerant to the internal heat exchanger 110.

The internal heat exchanger 110 is mounted inside the air-conditioning case 150 and connected with the refrigerant circulation circuit (R) of the outlet side of the compressor 100 so as to exchange heat between air flowing inside the air-conditioning case 150 and the refrigerant discharged from the compressor 100.

Furthermore, the evaporator 160 is mounted inside the air-conditioning case 150 and connected with the refrigerant circulation circuit (R) of the inlet side of the compressor 100 so as to exchange heat between the air flowing inside the air-conditioning case 150 and the refrigerant supplied to the compressor 100.

The internal heat exchanger 110 serves as a condenser all in the air-conditioning mode and the heat pump mode.

The evaporator 160 serves as an evaporator in the air-conditioning mode, but is stopped in the heat pump mode because refrigerant is not supplied and serves as an evaporator in the dehumidification mode because some of the refrigerant is supplied.

Moreover, the internal heat exchanger 110 and the evaporator 160 are spaced apart from each other at a predetermined interval inside the air-conditioning case 150, and in this instance, are mounted in order from the upstream side of the air flow direction inside the air-conditioning case 150.

Therefore, in the air-conditioning mode that the evaporator 160 serves as the evaporator, as shown in FIG. 2, the refrigerant of low-temperature and low-pressure discharged from the second expansion valve 140 is supplied to the evaporator 160, and in this instance, the air flowing inside the air-conditioning case 150 through the blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode that the internal heat exchanger 110 serves as a condenser, as shown in FIG. 3, the refrigerant of high-temperature and high-pressure discharged from the compressor 100 is supplied to the internal heat exchanger 110, and in this instance, the air flowing inside the air-conditioning case 150 through the blower (not shown) is converted into warm air by exchanging heat with the refrigerant of high-temperature and high-pressure of the internal heat exchanger 110 while passing through the internal heat exchanger 110, and then, is discharged to the interior of the vehicle to thereby heat the interior of the vehicle.

Moreover, a temperature-adjustable door 151 for adjusting an amount of air bypassing the internal heat exchanger 110 and an amount of air passing through the internal heat exchanger 110 is mounted between the evaporator 160 and the internal heat exchanger 110 inside the air-conditioning case 150.

The temperature-adjustable door 151 adjusts the amount of the air bypassing the internal heat exchanger 110 and the amount of the air passing through the internal heat exchanger 110 to thereby properly control temperature of the air discharged from the air-conditioning case 150.

In this instance, in the air-conditioning mode, as shown in FIG. 2, when a front side passage of the internal heat exchanger 110 is completely closed by the temperature-adjustable door 151, because the cold air passing through the evaporator 160 bypasses the internal heat exchanger 110 and is supplied to the interior of the vehicle, the maximum heating is carried out. In the heat pump mode, as shown in FIG. 3, when a passage bypassing the internal heat exchanger 110 is completely closed by the temperature-adjustable door 151, because all of the air is converted into warm air while passing through the internal heat exchanger 110 serving as the condenser and the warm air is supplied to the interior of the vehicle, the maximum heating is carried out.

Furthermore, the external heat exchanger 130 is mounted outside the air-conditioning case 150 and connected with the refrigerant circulation circuit (R) so as to exchange heat between the refrigerant circulating through the refrigerant circulation circuit (R) and the outdoor air.

Here, the external heat exchanger 130 is mounted at the front side of an engine room of the vehicle to exchange heat between the refrigerant flowing inside the external heat exchanger 130 and the outdoor air.

In the air-conditioning mode, the external heat exchanger 130 radiates heat like a condenser, and in this instance, the refrigerant of high-temperature and high-pressure flowing inside the external heat exchanger 130 radiates heat and is cooled (condensed) while exchanging heat with the outdoor air. In the heat pump mode, the external heat exchanger 130 absorbs heat like an evaporator, and in this instance, refrigerant of low-temperature flowing inside the external heat exchanger 130 absorbs heat and is heated (evaporated) while exchanging heat with the outdoor air.

Additionally, a fan (not shown) which compulsively sends the outdoor air toward the external heat exchanger 130 is mounted at one side of the external heat exchanger 130.

In the meantime, the external heat exchanger 130 is mounted at the front side inside the engine room of the vehicle and the electric radiator 210 which will be described later is also mounted at the front side inside the engine room. In this instance, the electric radiator 210 is mounted on the same line in the flow direction of the air passing through the external heat exchanger 130.

Furthermore, the first expansion valve 120 selectively expands the refrigerant discharged from the internal heat exchanger 110 according to the air-conditioning mode or the heat pump mode and includes: a two-way valve 125 which is mounted on the refrigerant circulation circuit (R) between the internal heat exchanger 110 and the external heat exchanger 130 to allow or stop a flow of the refrigerant; and the orifice 128 which is disposed integrally with the two-way valve 125 to expand the refrigerant.

That is, the first expansion valve 120 has the two-way valve 125 and the orifice 128 which are formed integrally.

Figure 6:
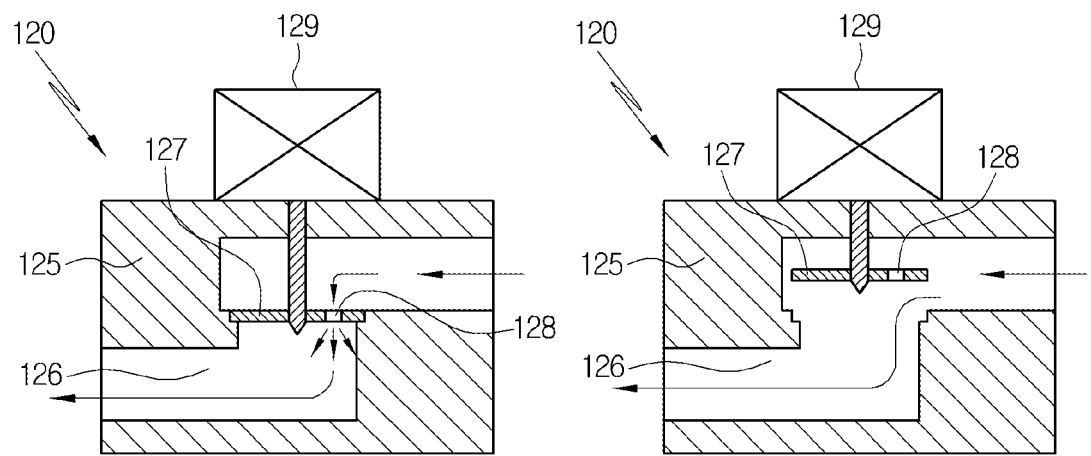
FIG. 6 is a schematic diagram showing an operated state of first expansion valve in the heat pump system for the vehicle according to the preferred embodiment of the present invention.
Figure 7:
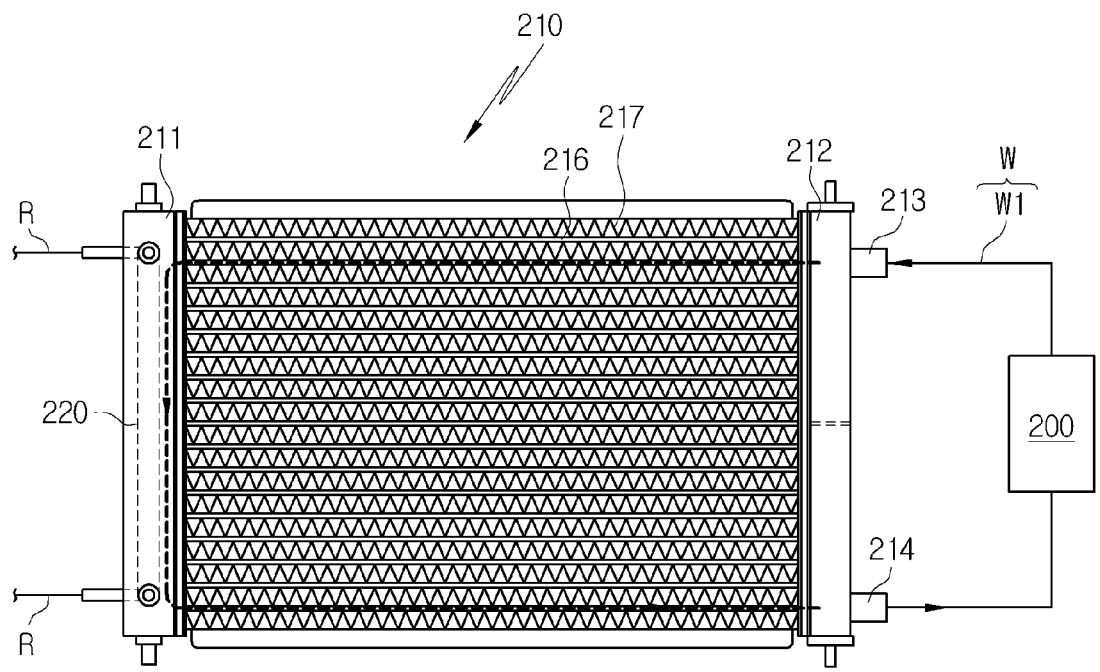
FIG. 7 is a view showing an electric radiator and a refrigerant-coolant heat exchanger in the heat pump system for the vehicle according to the preferred embodiment of the present invention.

FIG. 6 illustrates an operated state of the first expansion valve. In FIG. 6, the two-way valve 125 includes a path 126 formed therein for allowing the flow of the refrigerant and a valve member 127 for opening and closing the path 126.

In this instance, the orifice 128 is formed on the valve member 127 to expand the refrigerant.

Moreover, driving means 129 is mounted at one side of the two-way valve 125 to open and close the valve member 127.

The driving means 129 is a solenoid or a stepper motor which makes the valve member 127 perform a straight reciprocating motion to open or close the path.

Therefore, when the valve member 127 of the two-way valve 125 opens the path 126, the refrigerant passes through the two-way valve 125 without being expanded, but when the valve member 127 of the two-way valve 125 closes the path 126, the refrigerant passes through the two-way valve 125 after being expanded while passing through the orifice 128 of the valve member 127.

As described above, the two-way valve 125 is closed to expand and flow the refrigerant through the orifice 128 in the air-conditioning mode but is opened to make the refrigerant flow in an unexpanded state in the heat pump mode.

Meanwhile, because the first expansion valve 120 has the two-way valve 125 and the orifice 128 which are formed integrally, the first expansion valve 120 can reduce weight and secure an installation space.

Additionally, the second expansion valve 140 which expands the refrigerant supplied to the evaporator 160 is mounted on the refrigerant circulation circuit (R) of the inlet side of the evaporator 160 in order to expand the refrigerant discharged from the external heat exchanger 130 and to make the refrigerant flow into the evaporator 160.

The second expansion valve 140 may be an expansion valve or an orifice.

Additionally, the first bypass line (R1) is mounted in such a way as to connect the refrigerant circulation circuit (R) of the inlet side of the second expansion valve 140 and the refrigerant circulation circuit (R) of the outlet side of the evaporator 160 with each other, such that the refrigerant circulating through the refrigerant circulation circuit (R) selectively bypasses the second expansion valve 140 and the evaporator 160.

As shown in the drawings, the first bypass line (R1) is arranged in parallel with the second expansion valve 140 and the evaporator 160. That is, the inlet side of the first bypass line (R1) is connected with the refrigerant circulation circuit (R) which connects the external heat exchanger 130 and the second expansion valve 140 with each other, and the outlet side is connected with the refrigerant circulation circuit (R) which connects the evaporator 160 and the compressor 100 with each other.

As a result, in the air-conditioning mode, the refrigerant passing through the internal heat exchanger 130 flows toward the second expansion valve 140 and the evaporator 160, but, in the heat pump mode, the refrigerant passing through the external heat exchanger 130 directly flows toward the compressor 100 through the first bypass line (R1) and bypasses the second expansion valve 140 and the evaporator 160.

Here, the change in flow direction of the refrigerant according to the air-conditioning mode and the heat pump mode is achieved by the first direction changing valve 191.

The first direction changing valve 191 is mounted at a branching point of the first bypass line (R1) and the refrigerant circulation circuit (R) so as to change the flow direction of the refrigerant in such a manner that the refrigerant passing through the external heat exchanger 130 flows toward the first bypass line (R1) or the second expansion valve 140 according to the air-conditioning mode or the heat pump mode.

In this instance, the first direction changing valve 191 changes the flow direction of the refrigerant in such a manner that the refrigerant passing through the external heat exchanger 130 flows toward the second expansion valve 140 and the evaporator 160 in the air-conditioning mode, and changes the flow direction of the refrigerant in such a manner that the refrigerant passing through the external heat exchanger 130 flows toward the bypass line (R1) in the heat pump mode.

In the meantime, it is preferable that the first direction changing valve 191 is mounted at the branching point of the inlet side of the first bypass line (R1).

Moreover, the chiller 181 which exchanges heat between the refrigerant flowing along the first bypass line (R1) and the coolant (waste heat) circulating through the electronic units 200 of the vehicle is mounted on the first bypass line (R1).

The chiller 181 is a water-cooling type heat exchanger 181 for supplying the waste heat of the electronic units 200 of the vehicle to the coolant flowing through the first bypass line R1 including: a refrigerant heat exchange part 181a in which the refrigerant flowing in the first bypass line (R1) flows; and a coolant heat exchange part 181b in which the coolant circulating the electronic units 200 of the vehicle flows.

Therefore, in the heat pump mode, the heat pump system can enhance heating performance more and reduce power consumption of the system more due to increase of the evaporation amount because the refrigerant circulating through the refrigerant circulation circuit (R) absorbs heat from the coolant, the outdoor air and the waste heat of the electronic units 200 while passing through the refrigerant-coolant heat exchanger 220, the external heat exchanger 130 and the chiller 181.

In the meantime, there are motors, inverters and others as the electronic units 200 of the vehicle.

Moreover, a coolant circulation circuit (W) which circulates coolant toward the electronic units 200 of the vehicle to cool the electronic units 200 is mounted on the electronic units 200 of the vehicle.

The refrigerant-coolant heat exchanger 220 which exchanges heat between the refrigerant flowing from the first expansion valve 120 to the external heat exchanger 130 and the coolant circulating through the coolant circulation circuit (W) is mounted on the refrigerant circulation circuit (R) between the first expansion valve 120 and the external heat exchanger 130.

The coolant circulation circuit (W) includes: a first coolant circulation circuit (W1) which circulates the coolant of the electronic units 200 toward the refrigerant-coolant heat exchanger 220; and a second coolant circulation circuit (W2) which circulates the coolant of the electronic units 200 toward the chiller 181. Therefore, the coolant circulation circuit (W) circulates the coolant to the first coolant circulation circuit (W1) in the air-conditioning mode and circulates the coolant to the second circulation circuit (W2) in the heat pump mode.

That is, as shown in FIG. 2, in the air-conditioning mode, the coolant circulation circuit (W) circulates the coolant toward the electronic units 200 and the refrigerant-coolant heat exchanger 220 through the first coolant circulation circuit (W1) so as to supply the waste heat of the electronic units 200 of the vehicle to the refrigerant-coolant heat exchanger 220. In addition, as shown in FIG. 3, in the heat pump mode, the coolant circulation circuit (W) circulates the coolant toward the electronic units 200 and the chiller 181 through the second coolant circulation circuit (W2) so as to supply the waste heat of the electronic units 200 of the vehicle to the chiller 181.

A direction changing valve 230 is mounted at a branching point between the first coolant circulation circuit (W1) and the second coolant circulation circuit (W2) to change the flow direction of the coolant, and a water pump (not shown) for circulating the coolant is also mounted.

Furthermore, an air-cooling type electric radiator 210 is mounted on the first coolant circulation circuit (W1) to cool the coolant circulating through the first coolant circulation circuit (W1), and the refrigerant-coolant heat exchanger 220 is mounted inside the electric radiator 210.

Therefore, the refrigerant flowing inside the refrigerant-coolant heat exchanger 220 exchanges heat with the coolant flowing inside the electric radiator 210.

The electric radiator 210 includes: a pair of header tanks 211 and 212 which respectively have an inlet pipe 213 and an outlet pipe 214 connected with the first coolant circulation circuit (W1) and are spaced apart from each other at a predetermined interval; a plurality of tubes 216 of which both end portions are connected to the header tanks 211 and 212 to communicate the header tanks 211 and 212 with each other; and radiation fins 217 which are interposed among the tubes 216.

In this instance, the refrigerant-coolant heat exchanger 220 is inserted and mounted into one of the header tanks 211 and 212.

Therefore, the refrigerant flowing the refrigerant-coolant heat exchanger 220 radiates heat and is condensed after exchanging heat with the coolant flowing the electric radiator 210 in the air-conditioning mode, and absorbs heat and is evaporated after exchanging heat with the coolant congested inside the electric radiator 210 in the heat pump mode.

Here, because the coolant does not circulate toward the electric radiator 210 in the heat pump mode, the coolant inside the electric radiator 210 is in a congested state, and temperature of the congested coolant inside the electric radiator 210 is equal to temperature of the outdoor air temperature, and hence, the refrigerant flowing the refrigerant-coolant heat exchanger 220 can continuously absorb heat from the coolant congested inside the electric radiator 210 in the heat pump mode.

As described above, the refrigerant-coolant heat exchanger 220 is mounted on the refrigerant circulation circuit (R) of the inlet side of the external heat exchanger 130 to exchange heat between the refrigerant flowing to the external heat exchanger 130 and the coolant circulating through the electronic units 200 of the vehicle. Therefore, the heat pump system according to the present invention can enhance cooling performance and reduce power consumption without any increase in size of the external heat exchanger 130 due to increase of the condensation amount because the refrigerant radiates heat while passing through the refrigerant-coolant heat exchanger 220 and the external heat exchanger 130 in the air-conditioning mode and can enhance cooling performance and reduce power consumption due to increase of the evaporation amount because the refrigerant absorbs heat while passing through the refrigerant-coolant heat exchanger 220, the external heat exchanger 130 and the chiller 181 in the heat pump mode.

Moreover, in the heat pump mode, because the refrigerant passing through the refrigerant-coolant heat exchanger 220 is induced into the external heat exchanger 130 after exchanging heat with the coolant inside the electric radiator 210, the heat pump system according to the present invention can increase temperature of the refrigerant induced into the external heat exchanger 130, thereby delaying or removing frosting of the external heat exchanger 130.

Furthermore, because the second bypass line (R2) for connecting the refrigerant circulation circuit (R) of the inlet side of the refrigerant-coolant heat exchanger 220 and the refrigerant circulation circuit (R) of the outlet side of the external heat exchanger 130 with each other is mounted, the refrigerant circulating through the refrigerant circulation circuit (R) bypasses the refrigerant-coolant heat exchanger 220 and the external heat exchanger 130.

Therefore, when frosting is formed on the external heat exchanger 130, the refrigerant which circulates through the refrigerant circulation circuit (R) is induced into the second bypass line (R2) and bypasses the refrigerant-coolant heat exchanger 220 and the external heat exchanger 130, thereby preventing a damage of the electric radiator 210 by frosting and delaying or removing frosting of the external heat exchanger 130.

In the meantime, a second direction changing valve 192 for changing the flow direction of the refrigerant is mounted at the branching point between the second bypass line (R2) and the refrigerant circulation circuit (R) so as to make the refrigerant passing the first expansion valve 120 flow toward the refrigerant-coolant heat exchanger 220 in the air-conditioning mode and the heat pump mode and to make the refrigerant flow toward the second bypass line (R2) when frosting is formed on the external heat exchanger 130.

Of course, even though frosting is not formed on the external heat exchanger 130, if outdoor air temperature is low, the refrigerant flows toward the second bypass line (R2) and bypasses the refrigerant-coolant heat exchanger 220 and the external heat exchanger 130.

Additionally, a dehumidification line (R3) is mounted on the refrigerant circulation circuit (R) for supplying some of the refrigerant circulating through the refrigerant circulation circuit (R) to the evaporator 160 so as to carry out dehumidification of the interior of the vehicle.

The dehumidification line (R3) supplies some of the refrigerant passing the first expansion valve 120 to the evaporator 160.

In other words, the dehumidification line (R3) connects the refrigerant circulation circuit (R) of the outlet side of the first expansion valve 120 and the refrigerant circulation circuit (R) of the inlet side of the evaporator 160 with each other.

In the drawings, the inlet of the dehumidification line (R3) is connected to the refrigerant circulation circuit (R) between the first expansion valve 120 and the external heat exchanger 130, such that some of the refrigerant flows to a dehumidification line (R3) and is supplied to the evaporator 160 before being induced into the external heat exchanger 130 after passing the first expansion valve 120.

Moreover, an on-off valve 195 which opens and closes the dehumidification line (R3) is mounted on the dehumidification line (R3), such that some of the refrigerant passing the first expansion valve 120 can flow to the dehumidification line (R3) only in the dehumidification mode.

The on-off valve 195 opens the dehumidification line (R3) only in the dehumidification mode but closes the dehumidification line (R3) far from the dehumidification mode.

In the meantime, an outlet of the dehumidification line (R3) is connected with the refrigerant circulation circuit (R) of the inlet side of the evaporator 160, such that the refrigerant passing through the dehumidification line (R3) is directly induced into the evaporator 160.

Moreover, an accumulator 170 is mounted on the refrigerant circulation circuit (R) of the inlet side of the compressor 100.

The accumulator 170 divides the refrigerant which is supplied to the compressor 100 into the liquid-phase refrigerant and the gas-phase refrigerant and supplies only the gas-phase refrigerant to the compressor 100.

Moreover, an electric heater 115 for enhancing a heating efficiency is further mounted at the downstream side of the internal heat exchanger 110 inside the air-conditioning case 150.

That is, the heat pump system can enhance heating performance by operating the electric heater 115 at the beginning to start the vehicle as an auxiliary heat source, and can also operate the electric heater 115 when the heat pump system is lacking in the heat source.

It is preferable that the electric heater 115 is a PTC heater.

Hereinafter, the operation of the heat pump system for the vehicle according to the preferred embodiment of the present invention will be described.

A. Air-Conditioning Mode (Cooling Mode) (See FIG. 2)

In the air-conditioning mode (cooling mode), as shown in FIG. 2, the second bypass line (R2) is closed by the second direction changing valve 192, the first bypass line (R1) is also closed by the first direction changing valve 191, and the valve member 127 of the first expansion valve 120 opens the path 126, such that the refrigerant flows in the unexpanded state.

Moreover, the coolant is circulated to the electronic units 200 and the electric radiator 210 through the first coolant circulation circuit (W1).

Meanwhile, in order to achieve the maximum cooling, the temperature adjustable door 151 inside the air-conditioning case 150 closes the path passing through the internal heat exchanger 110, so that the air blown into the air-conditioning case 150 by the blower is cooled while passing through the evaporator 160 and bypasses the internal heat exchanger 110 to be supplied to the interior of the vehicle, thereby cooling the interior of the vehicle.

Continuously, a refrigerant circulation process will be described.

The gas-phase refrigerant of high-temperature and high-pressure discharged after being compressed in the compressor 100 is supplied to the internal heat exchanger 110 mounted inside the air-conditioning case 150.

As shown in FIG. 2, the refrigerant supplied to the internal heat exchanger 110 directly passes the first expansion valve 120 in the unexpanded state without exchanging heat with the air and passes the refrigerant-coolant heat exchanger 220 and the external heat exchanger 130 in order because the temperature adjustable door 151 closes the passage of the internal heat exchanger 110.

In this instance, the refrigerant passing the refrigerant-coolant heat exchanger 220 is first condensed (radiates heat) while exchanging heat with the coolant of the inside of the electric radiator 210, and then, is induced into the external heat exchanger 130 and is second condensed (radiates heat) while exchanging heat with the outdoor air passing the external heat exchanger 130, such that the gas-phase refrigerant is converted into the liquid-phase refrigerant.

Continuously, the refrigerant passing through the external heat exchanger 130 is decompressed and expanded while passing through the second expansion valve 140 so as to become a liquid-phase refrigerant of low-temperature and low-pressure, and then, is induced into the evaporator 160.

The refrigerant induced into the evaporator 160 is evaporated by exchanging heat with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is induced into the compressor 100 and recirculates the above cycle.

B. Heat Pump Mode (See FIG. 3)

In the heat pump mode, as shown in FIG. 3, the second bypass line (R2) is closed by the second direction changing valve 192 and the first bypass line (R1) is opened by the first direction changing valve 191, such that the refrigerant is not supplied to the second expansion valve 140 and the evaporator 160.

Moreover, the valve member 127 of the first expansion valve 120 closes the path 126, such that the refrigerant is expanded while passing the orifice 128.

Furthermore, the coolant circulates to the electronic units 200 and the chiller 181 through the second coolant circulation circuit (W2).

Additionally, in the first heating mode, the temperature adjustable door 151 inside the air-conditioning case 150 closes the path bypassing the internal heat exchanger 110, so that the air blown into the air-conditioning case 150 by the blower is changed into warm air while passing through the internal heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is induced into the internal heat exchanger 110 mounted inside the air-conditioning case 150.

The gas-phase refrigerant of high-temperature and high-pressure induced into the internal heat exchanger 110 is condensed while exchanging heat with the air blown into the air-conditioning case 150 by the blower, and in this instance, the air passing through the internal heat exchanger 110 is converted into warm air and supplied to the interior of the vehicle to heat the interior of the vehicle.

Continuously the refrigerant discharged from the internal heat exchanger 110 is decompressed and expanded while passing through the orifice 128 of the first expansion valve 120 so as to become a liquid-phase refrigerant of low-temperature and low-pressure, and then, passes the refrigerant-coolant heat exchanger 220 and the external heat exchanger 130, which serve as evaporators, in order.

In this instance, the refrigerant passing the refrigerant-coolant heat exchanger 220 is first evaporated (absorbs heat) while exchanging heat with the coolant congested in the electric radiator 210, and then, is induced into the external heat exchanger 130 and is second evaporated (absorbs heat) while exchanging heat with the outdoor air passing the external heat exchanger 130.

Continuously, the refrigerant passing the external heat exchanger 130 passes the first bypass line (R1) by the first direction changing valve 191. In this instance, the refrigerant passing the first bypass line (R1) exchanges heat with the coolant (waste heat) of the electronic units 200, which passes the coolant heat-exchanging part 181*b*, while passing through the refrigerant heat-exchanging part 181*a* of the water-cooling type heat exchanger 181 so as to be third evaporated (absorb heat), and then, is induced into the compressor 100 to recirculate the above cycle.

Figure 4:
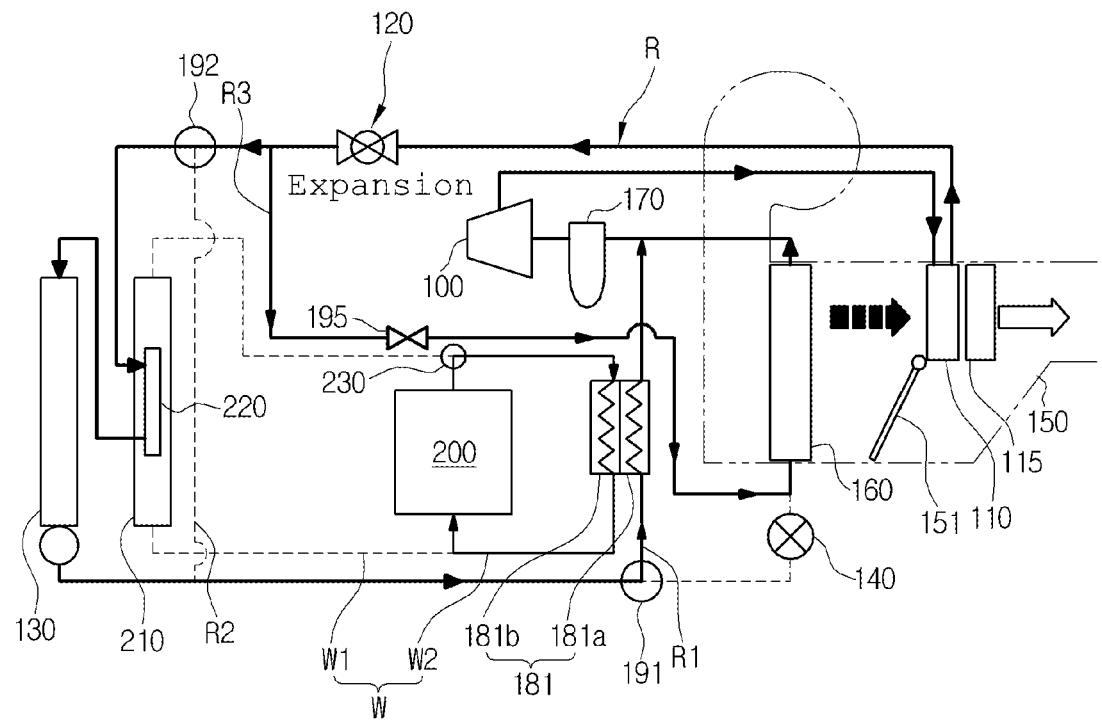
FIG. 4 is a configurative diagram of a dehumidification mode while carrying out the heat pump mode of the heat pump system for the vehicle according to the preferred embodiment of the present invention.

C. Dehumidification Mode of Heat Pump Mode (See FIG. 4)

The dehumidification mode of the heat pump mode is operated only in the case that dehumidification of the interior of the vehicle is needed while the system is operated in the heat pump mode of FIG. 3.

Therefore, only different parts from the first heating mode of FIG. 3 will be described.

In the dehumidification mode, the dehumidification line (R3) is additionally opened by the on-off valve 195 in the state where the first heating mode is operated.

Moreover, the temperature-adjustable door 151 inside the air-conditioning case 150 closes a passageway bypassing the internal heat exchanger 110. Therefore, air blown into the air-conditioning case 150 by a blower is cooled while passing the evaporator 160, and then, is changed into warm air while passing the internal heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

Some of the refrigerant passing the compressor 100, the internal heat exchanger 110, and the orifice 128 of the first expansion valve 120 passes the refrigerant-coolant heat exchanger 220 and the external heat exchanger 130, and some of the refrigerant passes the dehumidification line (R3).

The refrigerant passing the refrigerant-coolant heat exchanger 220 and the external heat exchanger 130 is evaporated while exchanging heat with the coolant and the outdoor air, and then, passes the first bypass line (R1) by the first direction changing valve 191. In this instance, the refrigerant passing the first bypass line (R1) exchanges heat with the coolant (waste heat) of the electronic units 200 passing the coolant heat exchange part 181b while passing the refrigerant heat exchange part 181a of the water-cooling type heat exchanger 181 so as to be evaporated.

The refrigerant passing the dehumidification line (R3) is supplied to the evaporator 160, and is evaporated while exchanging heat with the air flowing inside the air-conditioning case 150.

In the above process, the air passing the evaporator 160 is dehumidified, and the dehumidified air is changed into warm air while passing the internal heat exchanger 110, and then, is supplied to the interior of the vehicle so as to carry out dehumidification.

After that, the refrigerants respectively passing the water-cooling type heat exchanger 181 and the evaporator 160 meet together and are induced into the compressor 100, and then, the above-mentioned cycle is re-circulated.

D. Defrosting Mode During Heat Pump Mode (See FIG. 5)

Figure 5:
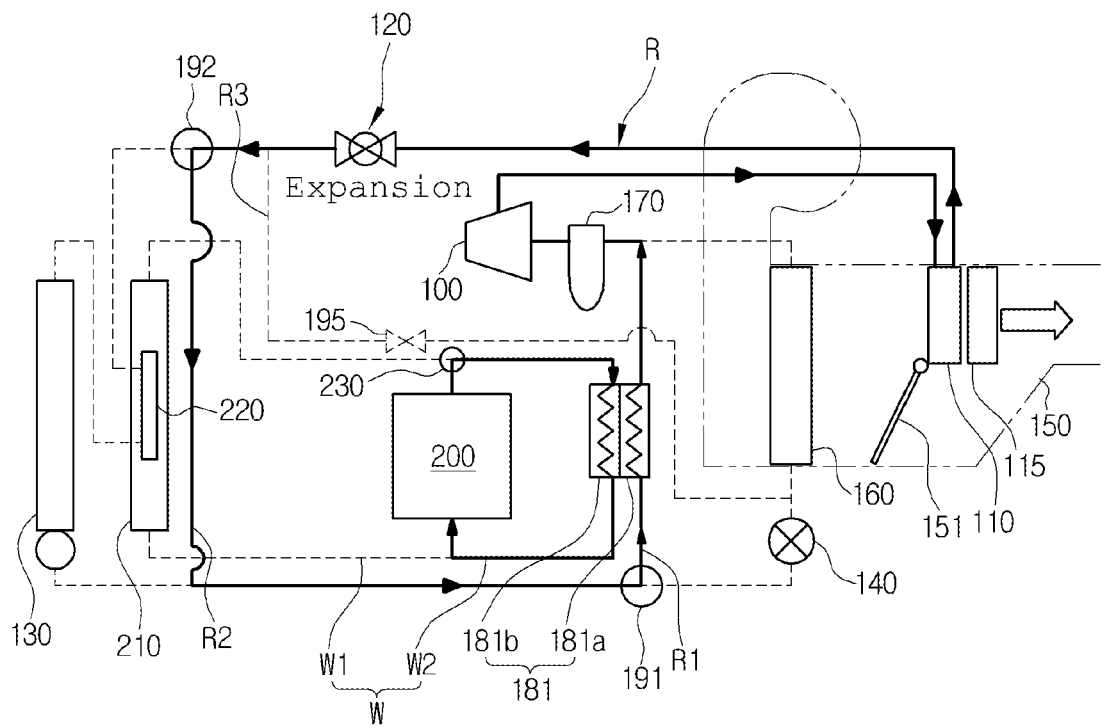
FIG. 5 is a configurative diagram of a defrosting mode while carrying out the heat pump mode of the heat pump system for the vehicle according to the preferred embodiment of the present invention.

The defrosting mode of the heat pump mode is operated in a case that frosting is formed on the external heat exchanger 130 or in a case that temperature of the outdoor air is lower than the setting temperature. As shown in FIG. 5, the second bypass line (R2) is opened by the second direction changing valve 192 and the first bypass line (R1) is opened by the first direction changing valve 191.

Additionally, the dehumidification line (R3) is closed by the on-off valve 195 and the refrigerant is expanded through the orifice 128 of the first expansion valve 120, such that the heat pump system is converted into an indoor air inflow mode to induce the indoor air into the air-conditioning case 150.

In addition, the coolant circulates to the electronic units 200 and the chiller 181 through the second coolant circulation circuit (W2).

Furthermore, in the defrosting mode, the temperature adjustable door 151 inside the air-conditioning case 150 closes the path bypassing the internal heat exchanger 110, so that the air blown into the air-conditioning case 150 by the blower is changed into warm air while passing through the internal heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is induced into the internal heat exchanger 110 mounted inside the air-conditioning case 150.

The gas-phase refrigerant of high-temperature and high-pressure induced into the internal heat exchanger 110 is condensed while exchanging heat with the air blown into the air-conditioning case 150 by the blower, and in this instance, the air passing through the internal heat exchanger 110 is converted into warm air and supplied to the interior of the vehicle to thereby heat the interior of the vehicle.

Continuously the refrigerant discharged from the internal heat exchanger 110 is decompressed and expanded while passing through the orifice 128 of the first expansion valve 120 so as to become a liquid-phase refrigerant of low-temperature and low-pressure, and then, flows into the second bypass line (R2) to bypass the refrigerant-coolant heat exchanger 220 and the external heat exchanger 130.

After that, the refrigerant passing the second bypass line (R2) passes through the first bypass line (R1) by the first direction changing valve 191. In this instance, the refrigerant passing the first bypass line (R1) exchanges heat with the coolant (waste heat) of the electronic units passing through the coolant heat-exchanging part 181b while passing through the refrigerant heat-exchanging part 181a of the water-cooling type heat exchanger 181 so as to be evaporated, and then, is induced into the compressor 100 to recirculate the above cycle.

<Explanation of essential reference numerals in drawings>

| | |
|---|---|
| 100: compressor | 110: internal heat exchanger |
| 115: electric heater | 120: first expansion means |
| 128: orifice | 130: external heat exchanger |
| 135: fan | 140: second expansion means |
| 150: air-conditioning case | |
| 151: temperature-adjustable door | |
| 160: evaporator | 170: accumulator |
| 180: chiller | |
| 191: first direction changing valve | |
| 192: second direction changing valve | |
| 200: electronic unit | 210: electric radiator |
| 220: refrigerant-coolant heat exchanger | |
| R: refrigerant circulation line | |
| R1: first bypass line | R2: second bypass line |
| R3: dehumidification line | |

The invention claimed is:

1. A heat pump system for a vehicle, comprising:
a compressor mounted on a refrigerant circulation circuit for compressing and discharging refrigerant;
an internal heat exchanger mounted inside an air-conditioning case for exchanging heat between the air inside the air-conditioning case and the refrigerant discharged from the compressor;
an evaporator mounted inside the air-conditioning case for exchanging heat between the air inside the air-conditioning case and the refrigerant supplied to the compressor;
an external heat exchanger mounted outside the air-conditioning case for exchanging heat between the refrigerant circulating through the refrigerant circulation circuit and the outdoor air;
a first expansion valve mounted on the refrigerant circulation circuit and located between the internal heat exchanger and the external heat exchanger to selectively expand refrigerant discharged from the internal heat exchanger;

wherein the first expansion valve defines a path through which refrigerant flows and includes a valve member defining an orifice and moveable between an open position and a closed position, wherein when the valve member is in the open position the path is opened such that refrigerant passing therethrough is unexpanded, and wherein when the valve is in the closed position the path is closed except for the orifice such that the refrigerant expands as it passes through the valve member;

a second expansion valve mounted on the refrigerant circulation circuit of an inlet side of the evaporator to expand the refrigerant supplied to the evaporator;

a coolant circulation circuit configured to circulate coolant toward units of the vehicle to cool the electronic units; and a refrigerant-coolant heat exchanger mounted on the refrigerant circulation circuit at an inlet side of the external heat exchanger in series with the external heat exchanger and configured to exchange heat between the refrigerant flowing into the external heat exchanger and the coolant circulating through the coolant circulation circuit;

wherein the refrigerant circulating through the refrigerant circulation circuit radiates heat to the coolant and the outdoor air while passing through the refrigerant-coolant heat exchanger and the external heat exchanger in an air-conditioning mode;

wherein the refrigerant circulating through the refrigerant circulation circuit absorbs heat from the coolant and the outdoor air while passing through the refrigerant-coolant heat exchanger and the external heat exchanger in a heat pump mode;

wherein, in the air conditioning mode, the refrigerant circulation circuit is configured in such a way that the refrigerant circulates sequentially through the compressor, the internal heat exchanger, the first expansion valve in the open position, the refrigerant-coolant heat exchanger, the external heat exchanger, the second expansion valve, the evaporator and back to the compressor, and wherein in the heat pump mode, the refrigerant circulation circuit is configured in such a way that the refrigerant circulates sequentially through the compressor, the internal heat exchanger, the first expansion valve in the closed position, the refrigerant-coolant heat exchanger, the external heat exchanger and back to the compressor;

wherein the refrigerant circulation circuit includes a first bypass line extending between the refrigerant circulation circuit at an inlet side of the second expansion valve and the refrigerant circulation circuit at an outlet side of the evaporator to make the refrigerant circulating through the refrigerant circulation circuit bypass the second expansion valve and the evaporator;

wherein a chiller is positioned along the first bypass line for exchanging heat between the refrigerant flowing along the first bypass line and the coolant circulating through the coolant circulation circuit such that the refrigerant circulating through the refrigerant circulation circuit absorbs heat through the refrigerant-coolant heat exchanger, the external heat exchanger and the chiller in the heat pump mode;

wherein a radiator is disposed along and fluidly connected to the coolant circulation circuit;

wherein the coolant circulation circuit comprises a first coolant circulation circuit which extends from the electronic units to the radiator and from the radiator back to the electronic units;

wherein the coolant circulation circuit further comprises a second coolant circulation circuit which extends from the electronic units to the chiller and from the chiller to the electronic units;

wherein in the heat pump mode, the coolant circulates through the second coolant circulation circuit and does not circulate through the first coolant circulation circuit.

2. The heat pump system according to claim 1, wherein the refrigerant-coolant heat exchanger is mounted inside the radiator.

3. The heat pump system according to claim 1, wherein a dehumidification line which supplies some of the refrigerant passing through the first expansion valve toward the evaporator is mounted on the refrigerant circulation circuit to perform dehumidification inside the vehicle in the heat pump mode.

4. The heat pump system according to claim 2, wherein the radiator is mounted on the first coolant circulation circuit in the flow direction of the air passing through the external heat exchanger.

5. The heat pump system according to claim 1,
wherein the radiator includes a first header tank and a second header tank, and wherein the first header tank has an inlet pipe and an outlet pipe connected to the coolant circulation circuit for receiving the coolant of the coolant circulation circuit;

wherein the refrigerant-coolant heat exchanger is positioned inside the second header tank to allow refrigerant flowing inside the refrigerant-coolant heat exchanger to exchange heat with coolant flowing inside the radiator; and wherein the refrigerant-coolant heat exchanger has an inlet and an outlet connected to the refrigerant circulation circuit, and wherein the inlet and outlet each pass through the second header tank.

6. The heat pump system according to claim 1, wherein the internal heat exchanger is disposed along and fluidly connected to the refrigerant circulation circuit, the external heat exchanger is disposed along and fluidly connected to the refrigerant circulation circuit, and the refrigerant-coolant heat exchanger is mounted on the refrigerant circulation circuit between the first expansion valve and the external heat exchanger.

7. The heat pump system according to claim 1 wherein the refrigerant-coolant heat exchanger is not disposed along the first bypass line.

* * * * *